(12) United States Patent
Wu

(10) Patent No.: US 6,258,274 B1
(45) Date of Patent: Jul. 10, 2001

(54) METHOD FOR REDUCING SLUDGE WITHIN A RIVER OR THE LIKE

(76) Inventor: Kun-Cheng Wu, No. 9, Lane 301, Kuo-Hua St., Chia-Yi City (TW)

(*) Notice: Subject to any disclaimer, the term of this patent is extended or adjusted under 35 U.S.C. 154(b) by 0 days.

(21) Appl. No.: 09/610,180

(22) Filed: Jul. 5, 2000

(51) Int. Cl.[7] .................................................. C02F 9/00
(52) U.S. Cl. .................. 210/622; 210/747; 210/770; 210/798; 210/154; 210/170; 210/903; 405/52
(58) Field of Search ................................. 210/620, 622, 210/758, 769, 770, 747, 154, 170, 903, 798, 799; 405/52

(56) References Cited

U.S. PATENT DOCUMENTS

| | | | |
|---|---|---|---|
| 3,470,091 | * 9/1969 | Budd et al. | 210/747 |
| 3,505,213 | * 4/1970 | Anthony et al. | 210/747 |
| 3,563,380 | * 2/1971 | Thomas | 210/170 |
| 3,779,385 | * 12/1973 | Stroheckel | 210/154 |
| 3,850,807 | * 11/1974 | Jones | 210/170 |
| 4,298,471 | * 11/1981 | Dunkers | 405/52 |
| 4,452,548 | * 6/1984 | Balogh et al. | 405/52 |
| 4,664,792 | * 5/1987 | Fors et al. | 210/747 |
| 4,879,046 | * 11/1989 | Kojima | 210/747 |
| 4,911,849 | * 3/1990 | Labergue et al. | 210/170 |
| 5,344,557 | * 9/1994 | Scanzillo | 210/170 |
| 5,366,322 | * 11/1994 | Hurwitt | 405/52 |
| 5,478,473 | * 12/1995 | Oshima | 210/747 |
| 5,549,828 | 8/1996 | Ehrlich . | |
| 5,893,978 | 4/1999 | Yoda et al. . | |

\* cited by examiner

*Primary Examiner*—Christopher Upton
(74) *Attorney, Agent, or Firm*—Merchant & Gould P.C.

(57) ABSTRACT

A river is divided into a plurality of river sections via a plurality of partitions which are spaced apart along the direction of the flow of the river. Polluted water at or near the surface of the river from the river sections is pumped to water treating apparatuses without drawing the polluted water near the floor of the river. Suspension pollutants, including nitrogenous nutrients, are removed from the polluted water via filtration in the water treating apparatuses. After treatment, the treated water is sent to the river in such a manner that the water drawn from each river section is sent to another one of the river sections, that is located immediately downstream, at the same rate as the river flow and that the remaining portion of the treated water is sent back to the upstream river section from where the water comes. Successive removal of the suspension pollutants from the river sections results in releasing of nitrogenous nutrients from sludge on the floor of the river to upper parts of the river sections, thereby reducing the thickness of the sludge.

11 Claims, 3 Drawing Sheets

METHOD FOR REDUCING SLUDGE WITHIN A RIVER OR THE LIKE

BACKGROUND OF THE INVENTION

1. Field of the Invention

This application relates to a method for treating large flowing water bodies, such as rivers, or the like, more particularly to a method for reducing the thickness of the sludge covering the floor of a river or the like.

2. Description of the Related Art

Flowing water bodies, such as rivers, seas, etc., usually have the floors thereof covered with sludge that primarily contain organic substances. When the thickness of the sludge increases to a considerable extent, it can affect the sailing and transporting characteristics, the water holding capacity, and the quality of water of a river. Typical methods available in the art for reducing the thickness of the sludge generally comprise excavation, and/or chemical treatments. The excavation methods are costly and laborious, and the chemical treatments generally employ chlorine and ozone which can result in destruction to the ecology of aquatic animals and plants.

U.S. Pat. No. 5,549,828 discloses a method and apparatus for in situ water purification including sludge reduction via biofiltration and aeration. In this method, sludge reduction is conducted by extending a conduit to the bottom of a water body to draw the sludge into a vertical conduit and then bring the sludge into contact by a pumping system, with bacterial cultures preactivated to optimize enzyme production for sludge solubilization.

U.S. Pat. No. 5,893,978 discloses a method for purifying a lake/marsh into which a river flows. The method as disclosed is limited to the purification of water present in an area near the mouth of the river connected to the lake/marsh in order to purify the water entering the lake/marsh. This patent teaches the use of a purifier or filter floating in a water treating area or fixed at the bottom of the river in the water treating area to remove pollutants, such as eutrophic materials within the water. However, nothing disclosed therein suggests that removal of the eutrophic materials from the surface of a water body can reduce the thickness of sediments or sludge deposited on the floor below the water body.

SUMMARY OF THE INVENTION

An object of the invention is to provide a method for reducing the thickness of the sludge deposited on the floor of a river or the like by removing suspension pollutants, including eutrophic nutrients, from the polluted water at or near the water surface.

Another object of the invention is to provide a system which utilizes simple equipment for reducing the thickness of sludge deposited on the floor of a river or the like.

According to the present invention, a method for reducing the thickness of sludge deposited on the floor of a river, comprising (a) dividing the river into a plurality of river sections and blocking water from flowing between adjacent river sections by using a plurality of partitions which are spaced apart at intervals along the direction of water flow of the river, (b) providing a plurality of water treating apparatuses for respectively treating polluted water drawn from the river sections, (c) pumping the polluted water at or near the surface of the river from each of the river sections to the corresponding one of the water treating apparatuses without drawing the polluted water near the floor of the river, (d) removing fine suspension pollutants including nitrogenous nutrients from the polluted water via filtration carried out by the water treating apparatuses, and (f) returning the water treated by the water treating apparatuses to the river in such a manner that the water drawn from each of the river sections is sent to another one of the river sections that is located immediately downstream, whereby the sludge on the floor of the river can release nitrogenous nutrients to upper parts of the river sections, and the thickness thereof can be reduced.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
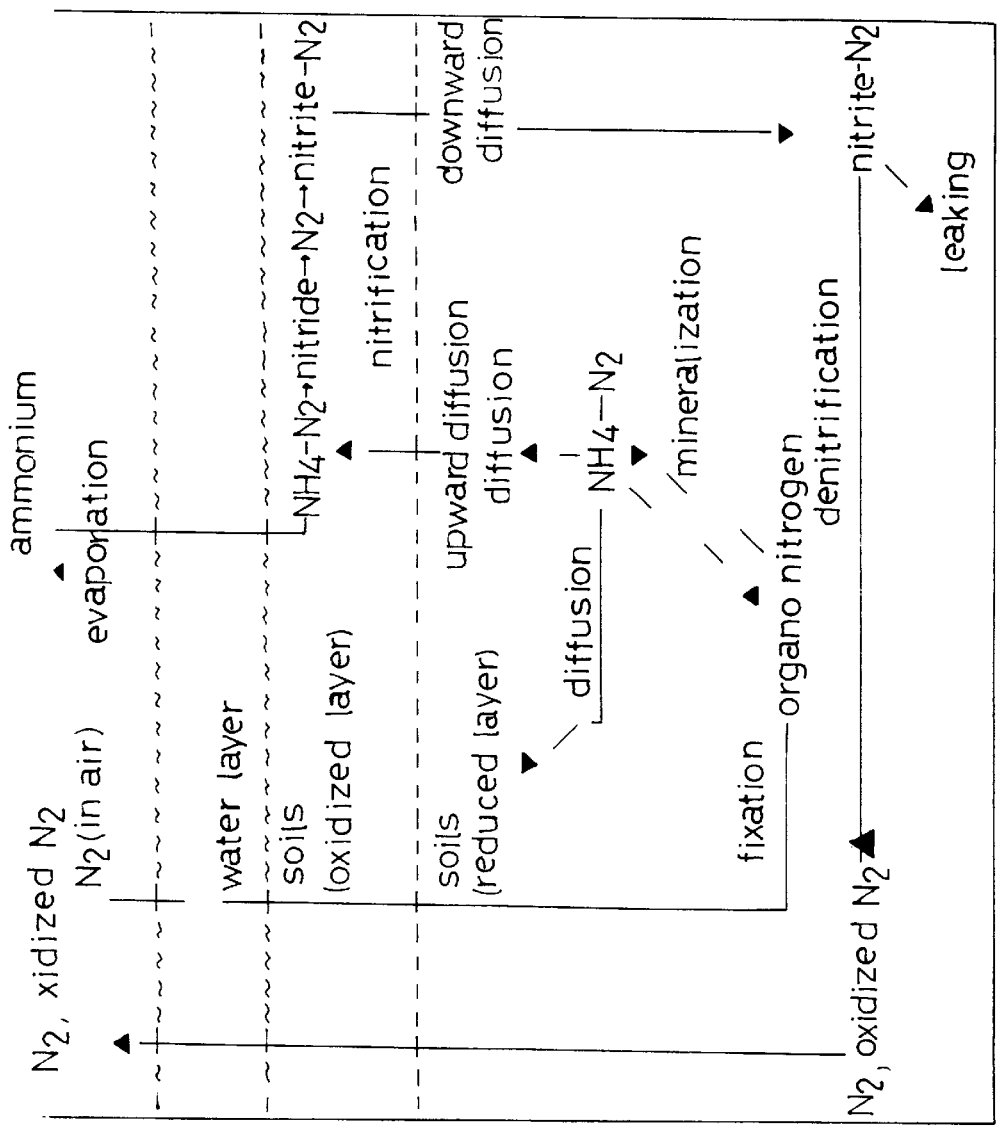
FIG. 1 is a diagram illustrating a nitrogen cycle occurring in a soil-water system.

The method according to the present invention conducts reduction of the sludge deposited beneath the water body of a river by removing suspension pollutants present in the water at or near the water surface of the river. It is known that fine suspension matters present in a water body, such as a river, lake or the like, contain eutrophic materials, such as nitrogenous compounds, which are nutrients for microorganisms and for algae breeding. Such nitrogenous nutrients are used by microorganisms in a soil-water system to make up the nitrogen cycle as illustrated in FIG. 1. Removal of such fine suspension pollutants including eutrophic nutrients from the water at or near the water surface will create a concentration gradient with respect to the nitrogenous nutrients in the soil-water system, or an unbalanced situation with respect to the biological phase in the soil-water system. As the biological phase in the soil-water system tends to change toward a balanced biological condition, the sludge beneath the water body will decompose and release nitrogenous nutrients into the water body when the nitrogenous compounds in the water body is deficient. As the nitrogenous nutrients are released from the sludge, the sludge on the floor can become compact and dense, and the thickness of the sludge can be thereby reduced. This technical concept is utilized in reducing the thickness of sludge according to the present invention.

The present invention conducts removal of fine suspension pollutants present at or near the water surface from water treating areas of a river, which are arranged in succession along the flowing direction of the water. According to the present invention, sludge can be reduced within a long length of the river, such as from several kilometers to hundreds of kilometers.

Figure 2:
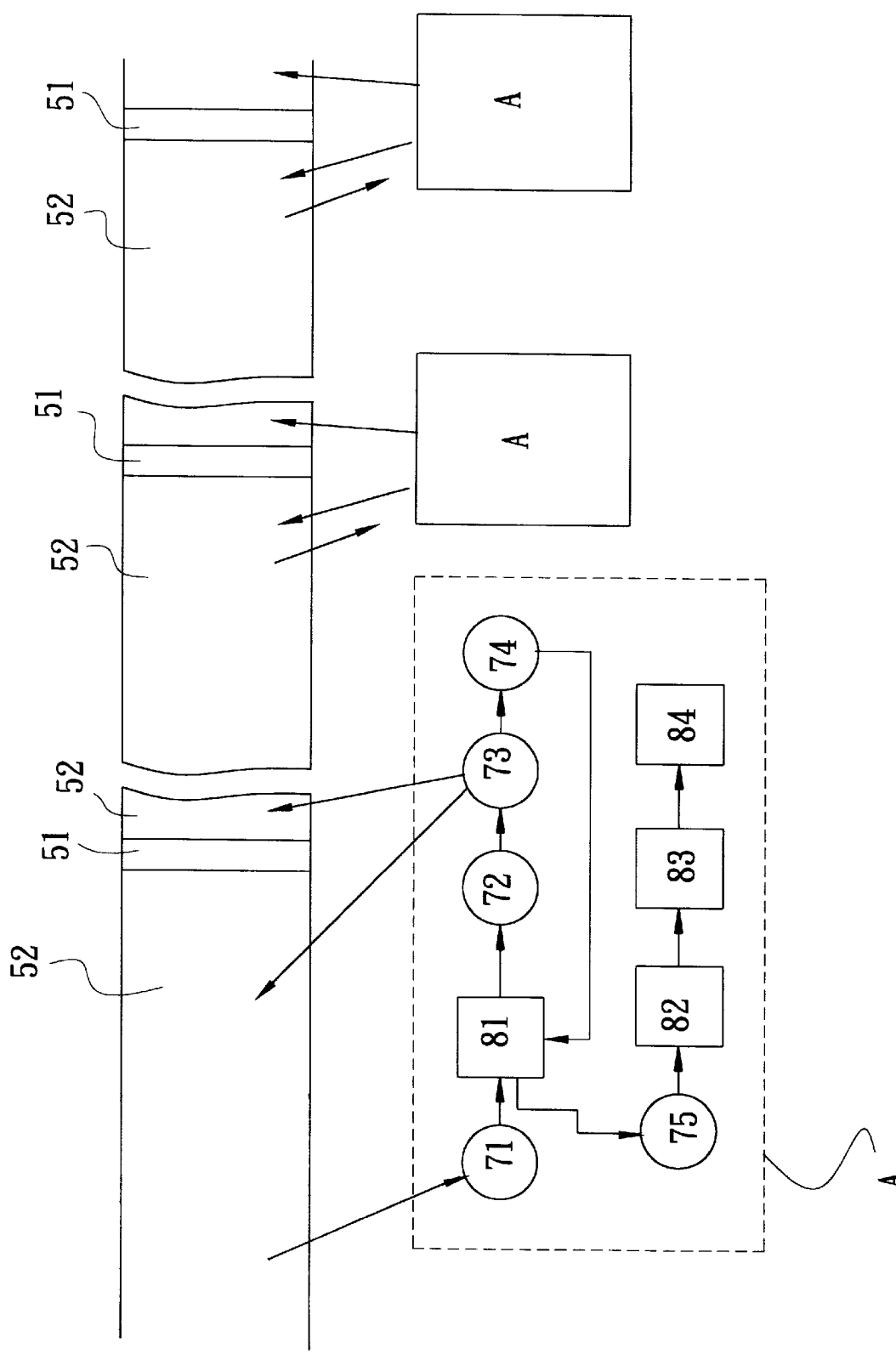
FIG. 2 is a schematic view illustrating an embodiment of a method according to the present invention.

The method according to the present invention comprises the step of dividing the river into river sections by utilizing a plurality of partitions which are spaced apart at intervals along the direction of the flow of the river. As shown in FIG. 2, in a preferred embodiment of the method of the present invention, a plurality of partitions 51 are installed within a lengthy part of the river. The partitions 51 are disposed at intervals in the direction of the water flow of the river so as to divide the river into a plurality of sections 52 each of which is provided downstream of the other one located adjacent thereto. The interval of the partitions 51 may be of any suitable length, such as from 1 kilometer to several decades of kilometers and is chosen according to the amounts of pollutants in the river. If the interval is short, the time required to treat the river according to the present invention is less, but the number of the partitions 51 needed is increased, thereby requiring a high cost for treatment. If the intervals are long, it would take a considerable time for treatment of the river while the cost for treatment will be lowered.

The partitions 51 are arranged such that they substantially block the river between two adjacent sections 52 so as to prevent water from flowing between two sections 52. The partitions 51 may be concrete structures or steel panels having bottom ends extending to the bottom of the river and top ends extending above the water surface. Each partition 51 substantially extends from one side to an opposite side of the river in the direction of the width of the river. Polluted water at or near the water surface of the river is drawn from the sections 52 to a plurality of water treating apparatuses, respectively, for removal of fine suspension pollutants including nitrogeneous matters from the water. This embodiment utilizes a plurality of water treating apparatuses (A) which are disposed on one of the banks of the river.

In each water treating apparatus (A), there are five treatment reservoirs 71, 72, 73, 74 and 75 each of which can store about 20 tons of water. A filter device 81 is provided between the treatment reservoirs 71 and 72. Numerals 82, 83, and 84 respectively represent a cake de-watering device, an incinerator, and an ash collecting unit 84.

The reservoir 71 is adapted to receive the polluted water from the corresponding river section 52. The water from the river section 52 is drawn into the reservoir 71 at a rate faster than the flow rate of the river, preferably, 1.2 to 1.5 times greater than the flow rate of the river. In this embodiment, the water is sent into the reservoir 71 at a rate of about 360 tons/hr which is high than the rate of the water flow in the river, i.e. 240 tons/hr. According to the present invention, since the polluted water is drawn to each water treating apparatus (A) only from an upper part of the corresponding river section 52, water drawing pipe lines used in the present invention need not extend to the floor of the river. When the polluted water from the reservoir 71 is passed through the filter device 81 to the reservoir 73, fine suspension pollutants including nitrogenous substances or nutrients are removed via the filter device 81.

Figure 3:
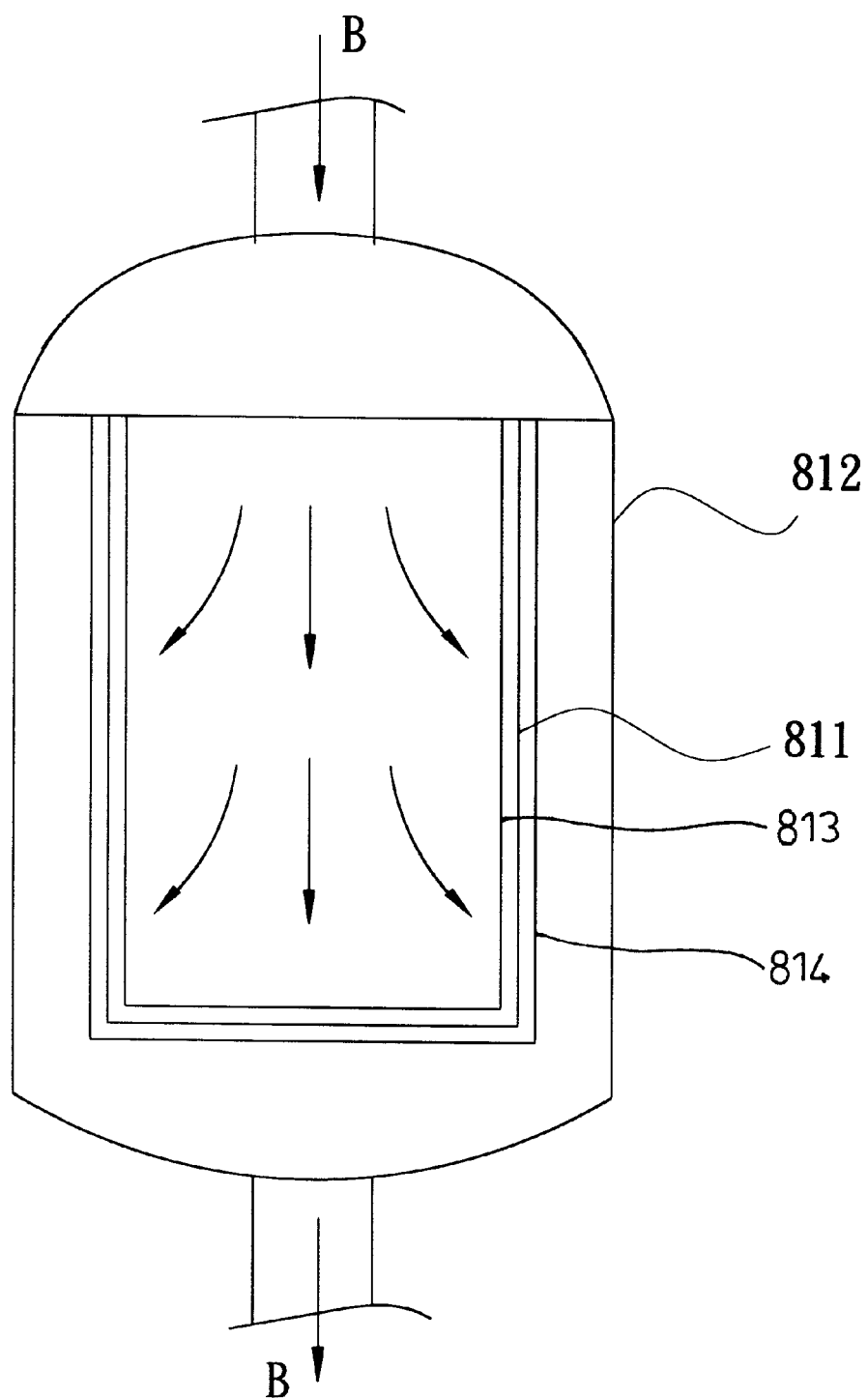
FIG. 3 shows an example of a filter device used in the method of the present invention.

As shown in FIG. 3, the filter device 81 employs a filter cloth made of a non-woven fabric from fibers, such as fibers of polypropylene, nylon, polyester, etc. The filter cloth 811 is formed as a cylinder with a closed end and an opposite open end, and is mounted inside a filter tank 812 by means of inner and outer holding frames 813, 814 which clamp the filter cloth 811 therebetween. When water flows into the filter tank 812 along a direction shown at (B), the water is filtered. The filter cloth 811 is so chosen that it has micro-pores which are sufficiently fine to remove nitrogenous nutrients from the water. For instance, the size of the micro-pores of the filter cloth 811 may be about 1–100 $\mu$m.

In addition to the filter device 81, oil filters (not shown) may be used upstream of the filter device 81 in order to remove oily substances in the polluted water. The filtrate from the filter device 81 is aerated in the treatment reservoir 72 to introduce dissolved oxygen in the filtrate. Preferably, aeration is conducted such that it can maintain an oxygen level of up to 2–5 ppm in the water.

The aerated filtrate from the treatment reservoir 72 flows at a rate of about 360 tons/hr into the treatment reservoir 73 which serves as a buffering region. After treatment, the treated water is sent to the river in such a manner that the water drawn from one of the river sections 52 immediately upstream of each partition 51 is sent to the other one of the river sections 52 immediately downstream of the river section 52, from which the water is drawn, substantially at the same rate as the flow rate of the river, which is 240 tons/hr. The remaining or excess portion of the water is resent to the original immediately upstream river section 52 at a rate of 120 tons/hr after treatment. Via control of the rates as such, the water flowing in the river will not be significantly disturbed, and safe sailing on the river can be ensured. On the other hand, continued removal of the suspension pollutants from successively arranged river sections can effectively reduce the amount of suspension pollutants from the river. Filtration is proceeded until 70%–95% of the suspension pollutants originally present in the polluted water are removed by the water treating apparatuses (A). It is noted that, after such an amount of suspension pollutants are removed from the polluted water, the thickness of the sludge on the floor of the river can be effectively reduced.

The method according to the present invention further includes the step of removing solids deposited on the filter device 81 in order to maintain the efficiency of the filter device 81. The solids deposited on the filter device 81 may be removed via a reverse-flow washing process, wherein the water from the treatment reservoir 74, which receives water from the treatment reservoir 73, may be fed into the filter cloth 811 in a direction opposite to the direction "B". The deposited solids removed from the filter device 81 are collected in the enclosed treatment reservoir 75 and then subjected to a de-watering process by means of the de-watering device 82 to form cakes. These cakes are burned in the incinerator 83. The resulting ash is collected in the ash collecting unit 84. The gas resulting from burning may be treated as follows:

(a) The gas may be collected in a water tank and bubbled with a compressed gas to increase dissolved oxygen and to convert the gas.

(b) The gas may be de-odorized in a manner similar to that conducted for cleaning and filtering air.

(c) The gas may be used as an energy source for a gas turbine of an electric generator.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for reducing the thickness of sludge deposited on the floor of a river, comprising;

(a) dividing the river into a plurality of river sections and blocking water from flowing between adjacent river sections by using a plurality of partitions which are spaced apart at intervals along the direction of water flow of the river;

(b) providing a plurality of water treating apparatuses for respectively treating polluted water drawn from the river sections;

(c) pumping the polluted water at or near the surface of the river from each of the river sections to the corresponding one of the water treating apparatuses without drawing the polluted water near the floor of the river;

(d) removing fine suspension pollutants including nitrogenous nutrients from the polluted water via filtration carried out by the water treating apparatuses; and (f) returning the water treated by the water treating apparatuses to the river in such a manner that the water drawn from each of the river sections is sent to another one of the river sections that is located immediately downstream;

whereby the sludge on the floor of the river can release nitrogenous nutrients to upper parts of the river sections, and the thickness thereof can be reduced.

2. The method according to claim 1, wherein each of the water treating apparatuses further carries out aeration of the water after filtration.

3. The method according to claim 2, wherein the rate of the polluted water flowing from each of the river sections to the corresponding one of the water treating apparatuses is greater than the flow rate of the river, and wherein the water, which has been drawn from one of the river sections and treated by the corresponding one of the water treating apparatuses, is sent in part, at the same rate as the flow rate of the river, to another one of the river sections located immediately downstream from where the water has been drawn, and resent in part to the corresponding one of the river sections from which the water has been drawn.

4. The method according to claim 3, wherein the amount of the suspension pollutants removed from the polluted water by the water treating apparatuses is about 70%–95% of the total suspension pollutants originally present in the river.

5. The method according to claim 4, wherein each of the water treating apparatuses includes a filter device having a filter cloth made of a non-woven fabric.

6. The method according to claim 5, wherein aeration is conducted to maintain an oxygen level of up to 2–5 ppm.

7. The method according to claim 6, wherein the water is further filtered to remove oily substances by the water treating apparatuses.

8. The method according to claim 3, wherein the rate of the water sent from the water treating apparatuses to the river is 1.2 to 1.5 times faster than the rate of the water flowing in the river.

9. The method according to claim 1, further comprising separating solid particles deposited on the filter device via a reverse-flow washing process, and collecting the separated solid particles.

10. The method according to claim 9, further comprising de-watering the collected solid particles to form cakes.

11. The method according to claim 10, further comprising burning the cakes in an incinerator.

* * * * *